US011122605B2

United States Patent
Wang et al.

(10) Patent No.: US 11,122,605 B2
(45) Date of Patent: Sep. 14, 2021

(54) TRANSMITTING METHOD, RECEIVING METHOD, RELAY DEVICE, BASE STATION AND MOBILE STATION

(71) Applicant: NTT DOCOMO INC., Tokyo (JP)

(72) Inventors: Huan Wang, Beijing (CN); Liu Liu, Beijing (CN); Qin Mu, Beijing (CN); Qun Zhao, Beijing (CN); Huiling Jiang, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 7 days.

(21) Appl. No.: 16/324,073

(22) PCT Filed: Jul. 13, 2017

(86) PCT No.: PCT/CN2017/092757
§ 371 (c)(1),
(2) Date: Feb. 7, 2019

(87) PCT Pub. No.: WO2018/028377
PCT Pub. Date: Feb. 15, 2018

(65) Prior Publication Data
US 2019/0215854 A1    Jul. 11, 2019

(30) Foreign Application Priority Data

Aug. 11, 2016  (CN) .......................... 201610656700.5

(51) Int. Cl.
*H04W 72/12* (2009.01)
*H04W 72/14* (2009.01)
*H04B 7/155* (2006.01)

(52) U.S. Cl.
CPC ........ *H04W 72/1278* (2013.01); *H04B 7/155* (2013.01); *H04W 72/14* (2013.01); *Y02D 30/70* (2020.08)

(58) Field of Classification Search
CPC .. H04W 72/1278; H04W 72/14; H04B 7/155; Y02D 70/10; Y02D 70/12; Y02D 70/126; Y02D 70/39
See application file for complete search history.

(56) References Cited

U.S. PATENT DOCUMENTS

| 2012/0093098 A1 | 4/2012 | Charbit et al. |
| 2014/0080494 A1* | 3/2014 | Lim .................... H04W 72/042 455/450 |

(Continued)

FOREIGN PATENT DOCUMENTS

| CN | 102246575 A | 11/2011 |
| CN | 104429150 A | 3/2015 |

(Continued)

OTHER PUBLICATIONS

Samsung "Discussion on SCI contents", 3GPP TSG RAN WG1 #85, R1-164765, Nanjing, China, May 23-27, 2016 (Year: 2016).*

(Continued)

*Primary Examiner* — Brian P Cox
(74) *Attorney, Agent, or Firm* — Osha Bergman Watanabe & Burton LLP

(57) ABSTRACT

Provided are a transmitting method, a receiving method, a relay device, a base station and a mobile station. According to embodiments of the present invention, the method for transmitting grant information performed by the relay device includes: receiving the grant information for inter-device transmission and a transmitting device identification and a receiving device identification corresponding to the grant information; generating first control information according to the grant information, the transmitting device identification and the receiving device identification; and transmitting the first control information.

10 Claims, 4 Drawing Sheets

(56) References Cited

U.S. PATENT DOCUMENTS

| | | | |
|---|---|---|---|
| 2014/0369292 A1 | 12/2014 | Wu et al. | |
| 2016/0044666 A1* | 2/2016 | Shin | H04W 76/14 370/336 |
| 2016/0157254 A1* | 6/2016 | Novlan | H04W 72/10 370/329 |
| 2018/0139724 A1* | 5/2018 | Loehr | H04W 72/02 |

FOREIGN PATENT DOCUMENTS

| | | |
|---|---|---|
| CN | 104429150 A | 3/2015 |
| CN | 105025553 A | 11/2015 |
| WO | WO-2016099227 A1 | 6/2016 |

OTHER PUBLICATIONS

International Search Report regarding PCT/CN2017/092757, dated Sep. 26, 2017.
International Preliminary Report on Patentability regarding PCT/CN2017/092757, including the English translation of the Written Opinion, dated Feb. 12, 2019.
Extended European Search Report in counterpart European Application No. 17838507.6 dated Apr. 15, 2020 (11 pages).
M. Hasan et al; "Resource Allocation for Network-Integrated Device-to-Device Communications Using Smart Relays"; 2013 IEEE Globecom Workshops, pp. 591-596; Dec. 9, 2013 (6 pages).

* cited by examiner

TRANSMITTING METHOD, RECEIVING METHOD, RELAY DEVICE, BASE STATION AND MOBILE STATION

CROSS-REFERENCE TO RELATED APPLICATIONS

This application is a 371 U.S. National Stage of International Application No. PCT/CN2017/092757, filed on Jul. 13, 2017, which claims priority to Chinese Application No. 201610656700.5, filed on Aug. 11, 2016. The entire disclosures of the above applications are incorporated herein by reference.

TECHNICAL FIELD

The present invention relates to a field of wireless communication, and more particularly, to a method for transmitting grant information, a method for receiving grant information, a relay device, a base station and a mobile station which can be used in a wireless communication system.

BACKGROUND

In a subsequent system of LTE system (e.g. sometimes referred to as LTE-Advanced or LTE-Advanced Pro), Device-to-Device (D2D) communication is proposed. In the D2D communication mode, data can be directly transmitted between terminal devices without going through network side devices such as base stations, thereby increasing network capacity and improving frequency efficiency.

On the other hand, an Internet of Things technology is continually developing in recent years. Narrow Band Internet of Things (NB-IoT) is an emerging Internet of Things technology that can be widely used in the world, which supports a cellular data connection of low-power-consumption devices in a Wide Area Network (WAN), can be deployed directly in a GSM network, a UMTS network or a LTE network, and has the characteristics of wide coverage, multiple connections, low rate, low cost, low power consumption, excellent architecture and so on.

In the NB-IoT, in order to improve the coverage of the network, a Transmission Time Interval bundling (TTI bundling) technology can be adopted. The Transmission Time Interval bundling technology is a technology in which a base station repeatedly transmits one data packet on a plurality of consecutive Transmission Time Interval (TTI) resources, so that a receiving device combines data on the plurality of TTI resources for reception. The Transmission Time Interval bundling technology in the NB-IoT can effectively improve a transmission quality and expand the coverage.

A Device-to-Device communication technology based on the Narrow Band Internet of Things has been proposed. When Device-to-Device technology based communication is performed, although data can be directly transmitted between the terminal devices, it is still necessary to transmit control signaling, such as grant information, from a base station (eNB) to the terminal devices. However, in the Transmission Time Interval bundling technology, a user equipment has to be on for a long time to ensure integrity of information transmission when the information is transmitted in the Narrow Band Internet of Things. Therefore, when the base station transmits to mobile stations by the Transmission Time Interval bundling technology, it can cause high power consumption of the user equipment and a waste of resources.

SUMMARY OF THE INVENTION

According to an aspect of the present invention, there is provided a method for transmitting grant information performed by a relay device. The method comprises: receiving the grant information for inter-device transmission and a transmitting device identification and a receiving device identification corresponding to the grant information; generating first control information according to the grant information, the transmitting device identification and the receiving device identification; and transmitting the first control information.

According to another aspect of the present invention, there is provided a method for transmitting grant information performed by a base station. The method comprises: determining the grant information for inter-device transmission and a transmitting device identification and a receiving device identification corresponding to the grant information; transmitting to the relay device the grant information and the transmitting device identification and the receiving device identification corresponding to the grant information; determining scheduling information, the scheduling information indicating a time when the relay device transmits the grant information and the transmitting device identification and the receiving device identification corresponding to the grant information; and transmitting to the relay device the scheduling information.

According to another aspect of the present invention, there is provided a method for receiving grant information performed by a terminal device. The method comprises: receiving first control information; determining the grant information and a transmitting device identification and a receiving device identification corresponding to the grant information according to the first control information; and using a resource indicated by the grant information for transmission or reception when the terminal device is determined to be the transmitting device or the receiving device according to the transmitting device identification and the receiving device identification.

According to another aspect of the present invention, there is provided a relay device. The relay device comprises: a receiving unit configured to receive the grant information for inter-device transmission and a transmitting device identification and a receiving device identification corresponding to the grant information; an information generating unit configured to generate first control information according to the grant information, the transmitting device identification and the receiving device identification; and a transmitting unit configured to transmit the first control information.

According to another aspect of the present invention, there is provided a base station. The base station comprises: a determining unit configured to determine the grant information for inter-device transmission and a transmitting device identification and a receiving device identification corresponding to the grant information; and a transmitting unit configured to transmit to the relay device the grant information and the transmitting device identification and the receiving device identification corresponding to the grant information; the determining unit further configured to determine scheduling information, the scheduling information indicating a time when the relay device transmits the grant information and the transmitting device identification and the receiving device identification corresponding to the grant information, and the transmitting unit further configured to transmit to the relay device the scheduling information.

According to another aspect of the present invention, there is provided a terminal device. The terminal device comprises: a receiving unit configured to receive first control information; an information acquiring unit configured to determine the grant information and a transmitting device identification and a receiving device identification corresponding to the grant information according to the first control information; and a transmitting unit, wherein the receiving unit or the transmitting unit uses a resource indicated by the grant information for transmission or receiption when the terminal device is determined to be the transmitting device or the receiving device according to the transmitting device identification and the receiving device identification.

BRIEF DESCRIPTION OF THE DRAWINGS

The above and other objects, features and advantages of the present invention will become clearer by describing embodiments of the present invention in detail with reference to the accompanying drawings.

DESCRIPTION OF THE EMBODIMENTS

Figure 1:
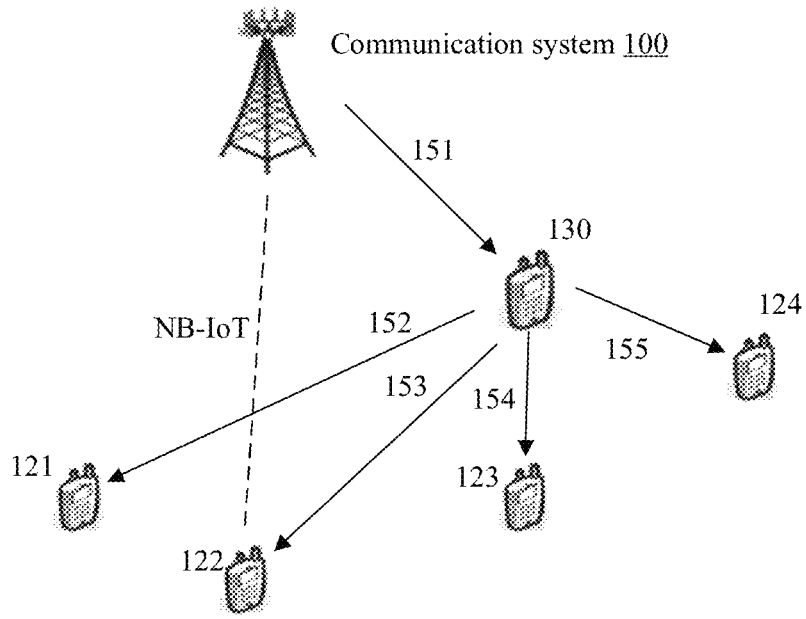
FIG. 1 shows a schematic diagram of a wireless communication system to which embodiments of the present invention may be applied.

Hereinafter, a method for transmitting grant information, a method for receiving grant information, a relay device, a base station and a mobile station according to embodiments of the present invention will be described below with reference to the accompanying drawings. Like reference numerals refer to like elements throughout the drawings. It should be understood that the embodiments described herein are merely illustrative and should not be constructed as limiting the scope of the present invention. Moreover, the UE described herein may include various types of terminal devices, such as a mobile device (or referred to as a mobile station) or a fixed terminal. However, for convenience, the UE, the terminal device and the mobile station sometimes may be used interchangeably hereinafter.

First, a wireless communication system 100 to which embodiments of the present invention may be applied will be described with reference to FIG. 1. FIG. 1 shows a schematic diagram of the wireless communication system 100 to which embodiments of the present invention may be applied.

In the communication system 100 shown in FIG. 1, a base station 110 can communicate with terminal devices by using a full bandwidth of the communication system (for example, the bandwidth of an LTE system), or via the Narrow Band Internet of Things (NB-IoT), where a bandwidth of the Narrow Band Internet of Things (NB-IoT) is less than the full bandwidth. The communication system 100 can communicate with terminal devices 121, 122, 123, and 124 via the Narrow Band Internet of Things (as shown in a dotted line in FIG. 1).

Moreover, Device-to-Device communication can be performed among the terminal devices 121 to 124. In order to enable one of the terminal devices 121 to 124 to perform Device-to-Device communication with other terminal devices, the base station 110 needs to transmit control signaling including, for example, grant information, to a data transmitting device and a data receiving device in the Device-to-Device communication. To improve the coverage of the network, the base station 110 can perform transmission with the terminal devices 121 to 124 by using the Transmission Time Interval bundling technology. However, as described above, if the base station 110 transmits to the terminal devices 121 to 124 by using the Transmission Time Interval bundling technology, it causes high power consumption of the user equipment and a waste of resources.

Embodiments of the present invention improve the method for transmitting and receiving the grant information. Hereinafter, the embodiments of the present invention will be described with reference to the drawings. In the embodiments in accordance with the present invention, the base station transmits to a relay device grant information for respective terminal devices that need to perform Device-to-Device communication, and the grant information is transmitted by the relay device to the respective terminal devices.

Figure 2:
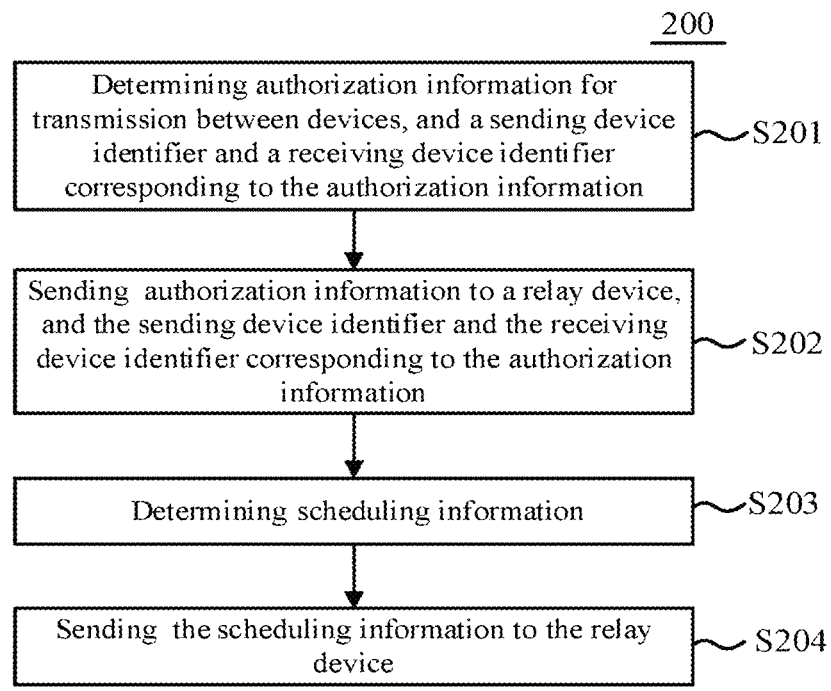
FIG. 2 shows a flow chart of a method for transmitting grant information performed by a base station according to one example of the present invention.

First, a method 200 for transmitting grant information performed by a base station according to embodiments of the present invention will be described with reference to FIG. 2. FIG. 2 shows a flow chart of the method 200 for transmitting the grant information performed by the base station according to one example of the present invention.

In step S201, the grant information for inter-device transmission and a transmitting device identification and a receiving device identification corresponding to the grant information are determined. For example, at a first time, it is expected to perform Device-to-Device communication between the terminal device 121 and the terminal device 122, and to perform Device-to-Device communication between the terminal device 123 and the terminal device 124. In step S201, first grant information for Device-to-Device communication between the terminal device 121 and the terminal device 122 and an identification of the transmitting device (i.e., the terminal device 122) and an identification of the receiving device (i.e., the terminal device 121) corresponding to the first grant information are determined; and second grant information for Device-to-Device communication between the terminal device 123 and the terminal device 124 and an identification of the transmitting device (i.e., the terminal device 123) and an identification of the receiving device (i.e., the terminal device 124) corresponding to the second grant information are determined.

In step S202, the grant information and the transmitting device identification and the receiving device identification corresponding to the grant information are transmitted to the relay device. In an example according to the present invention, the relay device may be a specific terminal device among the terminal devices connected to the base station. In addition, the base station can communicate with the relay device through the full bandwidth of the communication system.

As shown in FIG. 1, a terminal device 130 serving as the relay device is further included in the communication system 100. In addition, as shown by an arrow 151 in FIG. 1, in step S202, the grant information and the transmitting device identifications and the receiving device identifications corresponding to the grant information are transmitted to the relay device 130. For example, in step S202, the above first grant information and the identification of the transmitting device and the identification of the receiving device corresponding to the first grant information, and the above second grant information and the identification of the transmitting device and the identification of the receiving device corresponding to the second grant information may be transmitted to the relay device 130.

According to one example of the present invention, in step S202, the grant information and the transmission device identification and the reception device identification corresponding to the grant information may be transmitted to the relay device by using the full bandwidth of the communication system (for example, the bandwidth of the LTE system). For example, in step S202, Physical Downlink Shared Channel (PDSCH) may be used for the transmission. As another example, in step S202, PDSCH and/or Physical Downlink Control Channel (PDCCH) may be used for the transmission.

In step S203, scheduling information is determined. The scheduling information indicates the time when the relay device transmits the grant information and the transmitting device identifications and the receiving device identifications corresponding to the grant information. Then, in step S204, the scheduling information is transmitted to the relay device, so that the relay device transmits the grant information and the transmitting device identifications and the receiving device identifications corresponding to the grant information at the time indicated by the scheduling information. Like the grant information and the transmitting device identifications and the receiving device identifications corresponding to the grant information, in step S204, the scheduling information may be transmitted to the relay device by using the full bandwidth (for example, the bandwidth of the LTE network). For example, in step S204, PDSCH may be used for the transmission. As another example, in step S204, PDSCH and/or PDCCH may be used for the transmission.

It should be noted that, although it is described above as an example that the grant information and the transmission device identification and the reception device identification corresponding to the grant information are transmitted to the relay device 130 (i.e. step S202) firstly, and then the scheduling information is determined (i.e. step S203) and transmitted to the relay device (i.e. step S204), the present invention is not limited thereto. For example, after determining the grant information for the inter-device transmission and the transmitting device identifications and the receiving device identifications corresponding to the grant information according to step S201, the scheduling information may be determined, and then the grant information and the transmitting device identifications and the receiving device identifications corresponding to the grant information, as well as the scheduling information, may be simultaneously transmitted to the relay device.

It can be seen that, in the embodiment, the base station may transmit to the relay device the grant information for transmission among a plurality devices and the transmitting device identification and the receiving device identification corresponding to the grant information, and indicate the relay device to transmit the grant information and corresponding device identifications to the terminal devices intending to perform inter-device transmission, by transmitting the scheduling information to the relay device, thereby reducing power consumption of the terminal devices and the waste of resources. In addition, in the embodiment, the transmission to the relay device can be performed by the full bandwidth of the communication system, thereby reducing the power consumption of the relay device.

Figure 3:
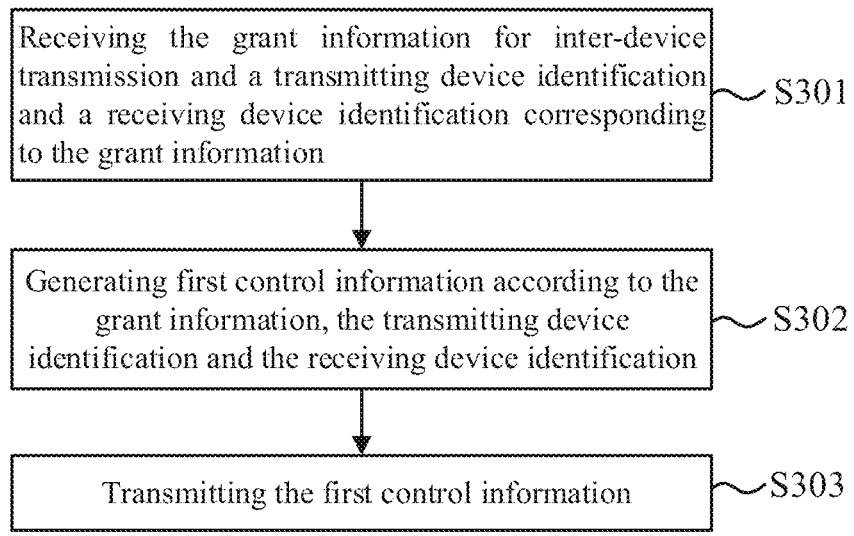
FIG. 3 shows a flowchart of a method for transmitting grant information performed by a relay device according to one example of the present invention.

Next, a method 300 for transmitting grant information performed by a relay device according to embodiments of the present invention will be described with reference to FIG. 3. FIG. 3 shows a flow chart of a method 300 for transmitting the grant information performed by the relay device according to one example of the present invention.

In step S301, the grant information and the transmitting device identification and the receiving device identification corresponding to the grant information are received. Specifically, the relay device may receive the grant information for inter-device transmission and the transmitting device identification and the receiving device identification corresponding to the grant information, transmitted from the base station. According to one example of the present invention, the relay device may receive the grant information for inter-device transmission and the transmitting device identification and the receiving device identification corresponding to the grant information, transmitted by the base station through the full bandwidth of the communication system, and the transmitting device identification and the receiving device identification corresponding to the grant information. For example, the relay device can receive the above information transmitted by the base station using PDSCH. As another example, the relay device can receive the above information transmitted by the base station using the PDCCH and/or the PDSCH.

Moreover, the grant information and the corresponding device identifications received in step S301 may be grant information and corresponding device identifications for all terminal devices which need to perform Device-to-Device communication in an area covered by signals of the relay device at a specific time. In other words, the grant information and the corresponding device identifications received in step S301 may include grant information for a set of terminal devices that perform Device-to-Device communication (i.e. one piece of grant information) and the corresponding device identifications, or may include grant information for a plurality of sets of terminal devices that need to perform Device-to-Device communication at the same time (i.e. a plurality of pieces of grant information) and the transmission device identification and the receiving device identification corresponding to each of the plurality of pieces of grant information.

Then, in step S302, first control information is generated according to the grant information, the transmitting device identification and the receiving device identification. For example, the first control information may include an information field and a check field. According to one example of the present invention, the grant information, the transmitting device identification and the receiving device identification may be added into the information field of the first control information to generate the first control information.

According to another example of the present invention, the grant information and the receiving device identification may be added into the information field of the first control information, the check field of the first control information is scrambled using the transmitting device identification, and the first control information is generated according to the information field and the scrambled check field. Therefore, the terminal device can descramble the check field of the first control information by using its own device identification to determine whether it is the transmitting device, thereby reducing the signaling overhead used by the first control information.

In step S303, the generated first control information is transmitted. For example, the relay device can transmit to the terminal device the generated first control information through Device-to-Device communication (as indicated by arrows 152-155 in FIG. 1). In the Device-to-Device communication, the second control information may be transmitted between the devices by the Scheduling Assignment (SA) resource(s) (for example, time and frequency resource (s)) in an SA resource pool, and data may be transmitted by data resource block(s) in a data resource pool. In addition, when the control information is transmitted by the SA resource block in the Scheduling Assignment resource pool, the check field of the control information may be scrambled by using default parameters.

According to one example of the present invention, in step S303, the first control information may be transmitted by using resource block(s) in the Scheduling Assignment resource pool. As described above, the check field of the first control information may be scrambled by using the transmitting device identification without using the default parameters, and the first control information is generated based on the information field and the scrambled check field. In this case, both the information scrambled by the default parameters and the first control information scrambled by the transmission device identification exist in the information transmitted by the relay device by using the SA resource block(s). Since it cannot be determined whether the information transmitted from the relay device is scrambled by the default parameters or scrambled by the transmitting device identification, the terminal device receiving the information transmitted from the relay device needs to respectively attempt to descramble the received information by the default parameters and by the device's own identification.

Moreover, according to another example of the present invention, in addition to the Scheduling Assignment resource pool and the data resource pool, a unicast resource pool is also set for Device-to-Device communication. In step S303, the first control information may be transmitted by using resource block(s) in the unicast resource pool. As described above, the check field of the first control information may be scrambled by using the transmitting device identification, and the first control information is generated based on the information field and the scrambled check field. In addition, the second control information different from the first control information may be scrambled by using default parameters, and the second control information is transmitted by using the SA resource block(s) so as to be descrambled by the terminal device.

In particular, the method shown in FIG. 3 may further comprise adding other control information different from the grant information into an information field of the second control information, using a second identification different from the transmitting device identification to scramble a check field of the second control information, generating the second control information based on the information field of the second control information and the scrambled check field of the second control information, and transmitting the second control information by using resource block(s) in the Scheduling Assignment resource pool.

Thus, the terminal device receiving the information sent from the relay device can use the identification of the device itself to descramble the first control information transmitted by using the resource block(s) in the unicast resource pool, and use the default parameters to descramble the second control information transmitted by using the SA resource block(s), thereby avoiding the problem of requiring twice descrambling for the information transmitted by the SA resource block(s).

According to another example of the present invention, in step S303, the first control information may be transmitted by using resource block(s) in the data resource pool.

Moreover, when receiving the plurality of pieces of grant information and the transmitting device identifications and the receiving device identifications corresponding to each of the plurality of pieces of grant information in step S301, according to one example of the present invention, in step S302, the first control information may be generated based on each piece of grant information and the device identifications corresponding to the grant information, so that the first control information corresponding to each piece of grant information is generated according to the grant information. In step S303, the first control information respectively generated for each piece of grant information may be transmitted by using resource block(s) in the Scheduling Assignment resource pool or resource block(s) in the unicast resource pool.

According to another example of the present invention, the first control information may also be generated according to the plurality of pieces of grant information and the transmitting device identifications and the receiving device identifications corresponding to each of the plurality of pieces of grant information in step S302, so that the first control information is not generated for each piece of grant information, and instead, the first control information regarding the plurality of pieces of grant control information is generated. In step S303, the first control information generated in common for the plurality of pieces of grant information is transmitted by using the data block(s) in the data resource pool.

Moreover, the method illustrated in FIG. 3 can also include receiving the scheduling information. For example, the scheduling information transmitted from the base station can be received. In step S303, the first control information may be transmitted according to the scheduling information. For example, in step S303, the first control information may be transmitted in a subframe(s) indicated by the scheduling information. Preferably, the method shown the in FIG. 3 may further comprise discarding a not-transmitted part of the first control information when the entire first control information cannot be transmitted within a predetermined time period or within a time period indicated in the scheduling information.

It can be seen that, in the embodiment, the relay device generates the control information according to the grant information and the transmitting device identification and the receiving device identification corresponding to the grant information which are received from the base station, and transmits the generated control information to the terminal device, thereby eliminating the need for the base station to transmit the grant information and the like to the terminal device, and reducing the power consumption of the terminal device and the waste of resources. In addition, in the embodiment, the relay device may receive the grant information and the transmitting device identification and the receiving device identification corresponding to the grant information from the base station through the full bandwidth of the communication system, and transmit the generated first control information to the terminal device by means of Device-to-Device communication, thereby reducing the power consumption of the relay device and the terminal device.

Figure 4:
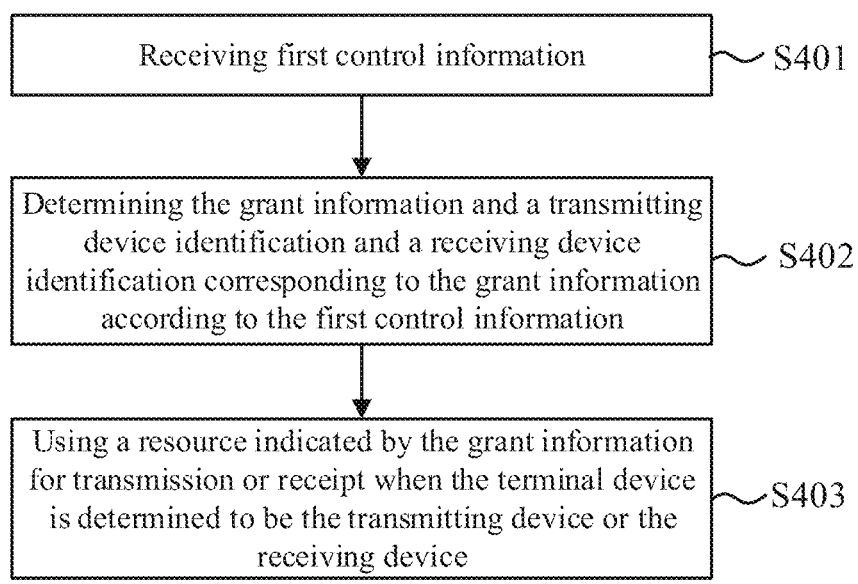
FIG. 4 shows a flowchart of a method for receiving grant information performed by a terminal device according to one example of the present invention.

Next, a method 400 for receiving grant information performed by a terminal device according to embodiments of the present invention will be described with reference to FIG. 4. FIG. 4 shows a flow chart of the method 400 for receiving the grant information performed by the terminal device according to one example of the present invention.

In step S401, the first control information is received, where the first control information may include the grant information, and information on the transmitting device identification and the receiving device identification corresponding to the grant information. For example, the terminal device may receive the first control information transmitted from the relay device by Device-to-Device transmission. As described above in connection with step S303, the terminal device may receive the first control information by the SA resource block(s) in the Scheduling Assignment resource pool, the unicast resource block(s) in the unicast resource pool or the data resource in the data resource pool.

In step S402, the grant information and the transmitting device identification and the receiving device identification corresponding to the grant information are determined according to the first control information. As described above in connection with step S302, according to one example of the present invention, the first control information may include the information field and the check field, and the grant information, the transmitting device identification and the receiving device identification are added into the information field of the first control information. In step S402, the grant information, and the transmitting device identification and the receiving device identification corresponding to the grant information may be extracted from the information field of the first control information.

According to another example of the present invention, the grant information and the receiving device identification may be added into the information field of the first control information, and the check field of the first control information may be scrambled by the transmitting device identification. In step S402, the grant information and the receiving device identification corresponding to the grant information are extracted from the information field of the first control information, and then the check field of the first control information is descrambled by using the identification of the terminal device to determine whether or not the terminal device is the transmitting device.

In step S403, when the terminal device is determined to be the transmitting device or the receiving device according to the transmitting device identification and the receiving device identification, it uses the resource indicated by the grant information for transmission or receipt.

It can be seen that, in the embodiment, the terminal device receives the first control information transmitted by the relay device to obtain the grant information about the Device-to-Device communication and the device identifications corresponding to the grant information, so that it is not necessary to receive the grant information and like from the base station through the Narrow Band Internet of Things, thereby reducing the power consumption of the terminal device and the waste of resources. In addition, in the embodiment, the terminal device may receive the first control information transmitted from the relay device by means of Device-to-Device communication, thereby reducing the power consumption of the relay device and the terminal device.

Figure 5:
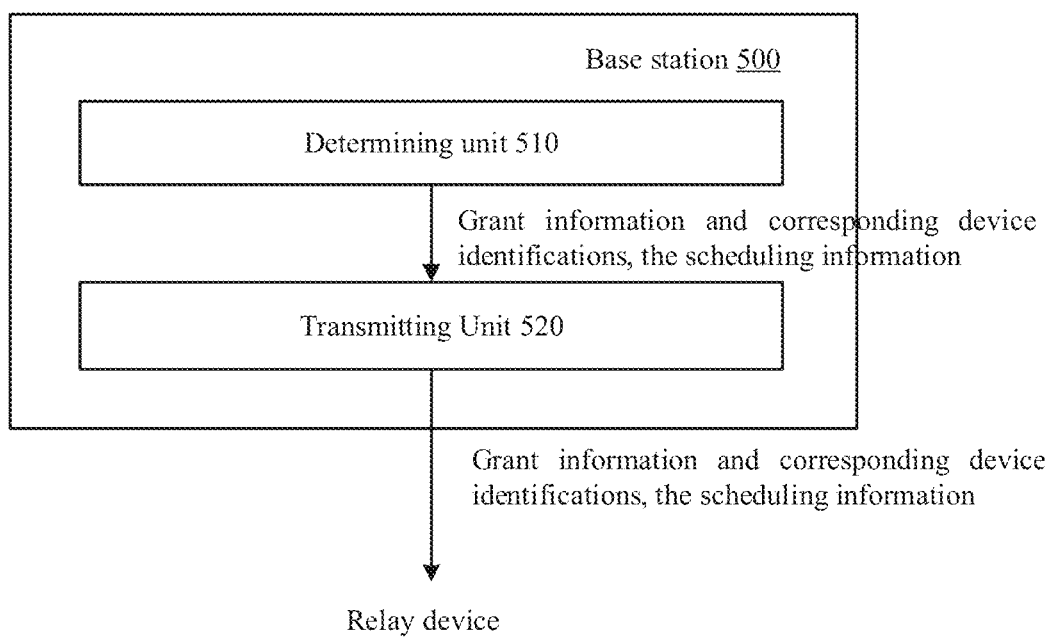
FIG. 5 shows a block diagram of the base station according to embodiments of the present invention.

Next, the base station according to embodiments of the present invention will be described with reference to FIG. 5. FIG. 5 shows a block diagram of a base station 500 according to embodiments of the present invention. As shown in FIG. 5, the base station 500 includes a determining unit 510 and a transmitting unit 520. The base station 500 may include other components in addition to these two units, however, since these components are not related to the content of embodiments of the present invention, the illustration and description thereof are omitted herein. In addition, since specific details of operations described below performed by the base station 500 according to embodiments of the present invention are the same as those described above with reference to FIGS. 1-2, the repeated description of the same details is omitted herein to avoid repetition. Similar to base station 100, the base station 500 can be used in the wireless communication system 100 shown in FIG. 1.

The determining unit 510 determines grant information for inter-device transmission and a transmitting device identification and a receiving device identification corresponding to the grant information. For example, in the communication system as shown in FIG. 1, at a first time, it is expected that Device-to-Device communication is performed between the terminal device 121 and the terminal device 122, and Device-to-Device communication is performed between the terminal device 123 and the terminal device 124. The determining unit 510 determines first grant information for Device-to-Device communication between the terminal device 121 and the terminal device 122 and an identification of the transmitting device (i.e. the terminal device 122) and an identification of the receiving device (i.e. the terminal device 121) corresponding to the first grant information, and determines second grant information for Device-to-Device communication between the terminal device 123 and the terminal device 124 and an identification of the transmitting device (i.e. the terminal device 123) and an identification of the receiving device (i.e. the terminal device 124) corresponding to the second grant information.

The transmitting unit 520 transmits to the relay device the grant information and the transmitting device identification and the receiving device identification corresponding to the grant information. In an example according to the present invention, the relay device may be a specific terminal device among the terminal devices connected to the base station. In addition, the base station can communicate with the relay device through the full bandwidth of the communication system.

As shown in FIG. 1, a terminal device 130 serving as the relay device is further included in the communication system 100. In addition, as shown by an arrow 151 in FIG. 1, the transmitting unit 520 transmits to the relay device 130 the grant information and the transmitting device identification and the receiving device identification corresponding to the grant information. For example, the transmitting unit 520 may transmit to the relay device 130 the above first grant information and the identification of the transmitting device and the identification of the receiving device corresponding to the first grant information, and the above second grant information and the identification of the transmitting device and the identification of the receiving device corresponding to the second grant information.

According to one example of the present invention, the transmitting unit 520 may transmit to the relay device the grant information and the transmission device identification and the reception device identification corresponding to the grant information, by using the full bandwidth of the communication system (for example, the bandwidth of the LTE system). For example, in step S202, the transmitting unit 520 may perform transmission by using Physical Downlink Shared Channel (PDSCH). As another example, the transmitting unit 520 may perform transmission by using PDSCH and/or Physical Downlink Control Channel (PDCCH).

The determining unit 510 determines scheduling information. The scheduling information indicates the time when the relay device transmits the grant information and the transmitting device identification and the receiving device identification corresponding to the grant information. Then, the transmitting unit 520 transmits to the relay device the scheduling information, so that the relay device transmits the grant information and the transmitting device identification and the receiving device identification corresponding to the grant information at the time indicated by the scheduling information. Similar to the grant information and the transmitting device identification and the receiving device identification corresponding to the grant information, the transmitting unit 520 may transmit to the relay device the scheduling information by using the full bandwidth (for example, the bandwidth of LTE network). For example, in step S204, PDSCH may be used for transmission. As another example, in step S204, PDSCH and/or PDCCH may also be used for transmission.

It can be seen that, in the embodiment, the base station may transmit to the relay device the grant information for transmission among a plurality devices and the transmitting device identification and the receiving device identification corresponding to the grant information, and indicate the relay device to transmit the grant information and corresponding device identifications to the devices intended to perform inter-device transmission by transmitting the scheduling information to the relay device, thereby reducing the power consumption of the terminal device and the waste of resources. In addition, in the embodiment, transmission to the relay device can be performed by the full bandwidth of the communication system, thereby reducing the power consumption of the relay device.

Figure 6:
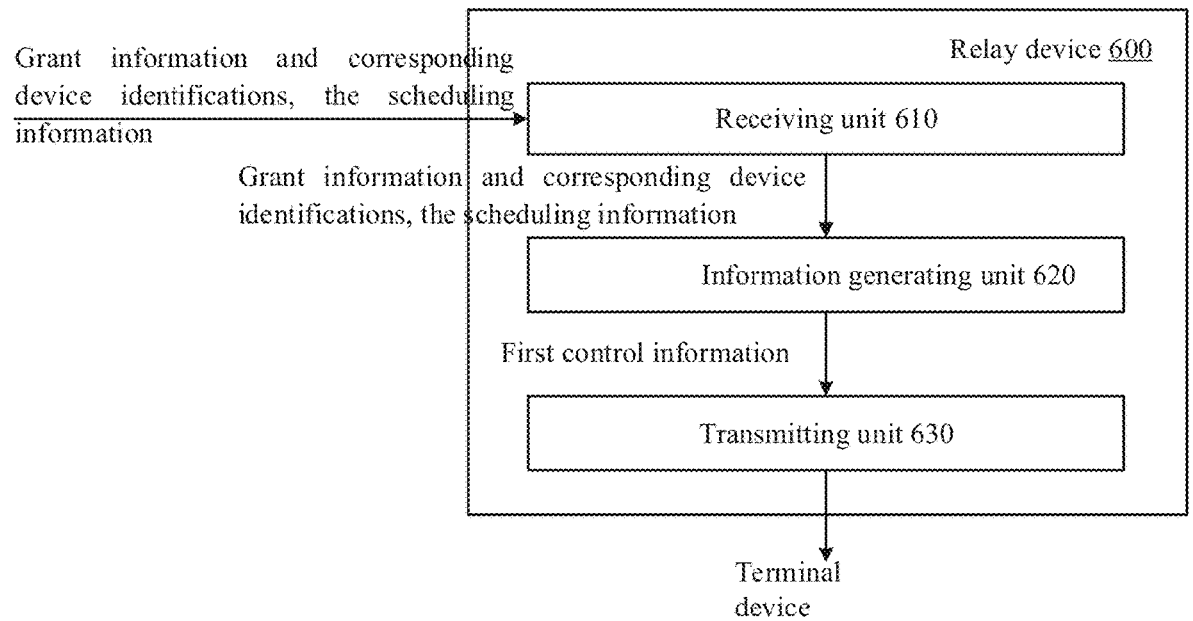
FIG. 6 shows a block diagram of the relay device according to embodiments of the present invention.

Next, the relay device according to embodiments of the present invention will be described with reference to FIG. 6. FIG. 6 shows a block diagram of a relay device 600 according to embodiments of the present invention. As shown in FIG. 6, the relay device 600 includes a receiving unit 610, an information generating unit 620 and a transmitting unit 630. The relay device 600 may include other components in addition to these three units, however, since these components are not related to the content of embodiments of the present invention, the illustration and description thereof are omitted herein. In addition, since specific details of operations described below performed by the relay device 600 according to embodiments of the present invention are the same as those described above with reference to FIG. 3, the repeated description of the same details is omitted herein to avoid repetition.

The receiving unit 610 receives the grant information for inter-device transmission and the transmitting device identification and the receiving device identification corresponding to the grant information. Specifically, the relay device may receive the grant information for inter-device transmission and the transmitting device identification and the receiving device identification corresponding to the grant information, transmitted from the base station. According to one example of the present invention, the relay device may receive the grant information for inter-device transmission and the transmitting device identification and the receiving device identification corresponding to the grant information, transmitted by the base station through the full bandwidth of the communication system. For example, the relay device can receive the above information transmitted by the base station by using PDSCH. As another example, the relay device can receive the above information transmitted by the base station by using the PDCCH and/or the PDSCH.

The grant information and the corresponding device identifications received by the receiving unit 610 may be grant information and corresponding device identifications for all terminal devices which need to perform Device-to-Device communication in an area covered by signals of the relay device at a specific time. In other words, the grant information and the corresponding device identifications received by the receiving unit 610 may include grant information for a set of terminal devices that perform Device-to-Device communication (i.e. one piece of grant information) and the corresponding device identifications, or may include grant information for a plurality of sets of terminal devices that need to perform Device-to-Device communication at the same time (i.e. a plurality of pieces of grant information) and the transmission device identification and the receiving device identification corresponding to each of the plurality of pieces of grant information.

Then, the information generating unit 620 generates first control information according to the grant information, the transmitting device identification and the receiving device identification. For example, the first control information may include an information field and a check field. According to one example of the present invention, the information generating unit 620 may add the grant information, the transmitting device identification and the receiving device identification into the information field of the first control information to generate the first control information.

According to another example of the present invention, the information generating unit 620 may include a first adding module, a first scrambling module and a first generating module. In particular, the first adding module adds the grant information and the receiving device identification into the information field of the first control information. The first scrambling module scrambles the check field of the first control information by using the transmitting device identification. Then, the first generating module generates the first control information according to the information field and the scrambled check field. Therefore, the terminal device can descramble the check field of the first control information by using its own device identification to determine whether it is the transmitting device, thereby reducing the signaling overhead used by the first control information.

The transmitting unit 630 transmits the generated first control information. For example, the relay device can transmit to the terminal device the generated first control information through Device-to-Device communication (as indicated by arrows 152-155 in FIG. 1). In the Device-to-Device communication, the control information may be transmitted between the devices by Scheduling Assignment (SA) resources (for example, time and frequency resources) in the SA resource pool, and data may be transmitted by data resource block(s) in the data resource pool. In addition, when the control information is transmitted by the SA resource block in the Scheduling Assignment resource pool, the check field of the control information may be scrambled by using default parameters.

According to one example of the present invention, the transmitting unit 630 may transmit the first control information by using resource block(s) in the Scheduling Assignment resource pool. As described above, the check field of the first control information may be scrambled by using the transmitting device identification without using the default parameters, and the first control information is generated based on the information field and the scrambled check field. In this case, both the information scrambled by the default parameters and the first control information scrambled by the transmission device identification exist in the information transmitted by the relay device by using the SA resource block(s). Since it cannot be determined whether the information transmitted from the relay device is scrambled by the default parameters or scrambled by the transmitting device identification, the terminal device receiving the information transmitted from the relay device needs to respectively attempt to descramble the received information by the default parameters and by the device's own identification.

Moreover, according to another example of the present invention, in addition to the Scheduling Assignment resource pool and the data resource pool, a unicast resource pool is also set for Device-to-Device communication. The transmitting unit 630 may transmit the first control information by using resource block(s) in the unicast resource pool. As described above, the check field of the first control information may be scrambled by using the transmitting device identification, and the first control information is generated based on the information field and the scrambled check field. In addition, the second control information different from the first control information may be scrambled by using the default parameters, and the second control information is transmitted by using the SA resource block(s) so as to be descrambled by the terminal device.

In particular, the information generating unit 620 may further comprise a second adding module, a second scrambling module and a second generating module. The second adding module may add other control information different from the grant information into the information field of the second control information. The second scrambling module may use a second identification different from the transmitting device identification to scramble the check field of the second control information. The second generating module may generate the second control information based on the information field of the second control information and the scrambled check field of the second control information. The transmitting unit 630 transmits the second control information by using resource block(s) in the Scheduling Assignment resource pool.

Thus, the terminal device receiving the information sent from the relay device can use the identification of the device itself to descramble the first control information transmitted by using resource block(s) in the unicast resource pool, and use the default parameters to descramble the second control information transmitted by using the SA resource block(s), thereby avoiding the problem of requiring twice descrambling for the information transmitted by the SA resource block(s).

According to another example of the present invention, the transmitting unit 630 may transmit the first control information by using resource block(s) in the data resource pool.

Moreover, when the receiving unit 610 receives the plurality of pieces of grant information and the transmitting device identification and the receiving device identification corresponding to each of the plurality of pieces of grant information, according to one example of the present invention, the information generating unit 620 may generate the first control information based on each piece of grant information and the device identifications corresponding to the grant information, so that the first control information corresponding to each piece of grant information is generated according to the grant information. The transmitting unit 630 may respectively transmit the first control information for respective pieces of grant information by using resource block(s) in the Scheduling Assignment resource pool or resource block(s) in the unicast resource pool.

According to another example of the present invention, the information generating unit 620 may also generate the first control information according to the plurality of pieces of grant information and the transmitting device identification and the receiving device identification corresponding to each of the plurality of pieces of grant information, so that the first control information is not generated for each piece of grant information, and the first control information regarding the plurality of pieces of grant information is generated. The transmitting unit 630 may transmit the first control information generated in common for the plurality of pieces of grant information by using the data block(s) in the data resource pool.

Moreover, the receiving unit 610 can also receive the scheduling information. For example, the receiving unit 610 can receive the scheduling information transmitted from the base station. The transmitting unit 630 may transmit the first control information according to the scheduling information. For example, the transmitting unit 630 may transmit the first control information in the subframe(s) indicated by the scheduling information. Preferably, the relay device shown the in FIG. 6 may further discard a not-transmitted part of the first control information when the entire first control information cannot be transmitted within a predetermined time period or within a time period indicated in the scheduling information.

It can be seen that, in the embodiment, the relay device generates the control information according to the grant information and the transmitting device identification and the receiving device identification corresponding to the grant information, which are received from the base station, and transmits the generated control information to the terminal device, thereby eliminating the need for the base station to transmit the grant information and the like to the terminal device, and reducing the power consumption of the terminal device and the waste of resources. In addition, in the embodiment, the relay device may receive the grant information and the transmitting device identification and the receiving device identification corresponding to the grant information from the base station through the full bandwidth of the communication system, and transmit the generated first control information to the terminal device by means of Device-to-Device communication, thereby reducing the power consumption of the relay device and the terminal device.

Figure 7:
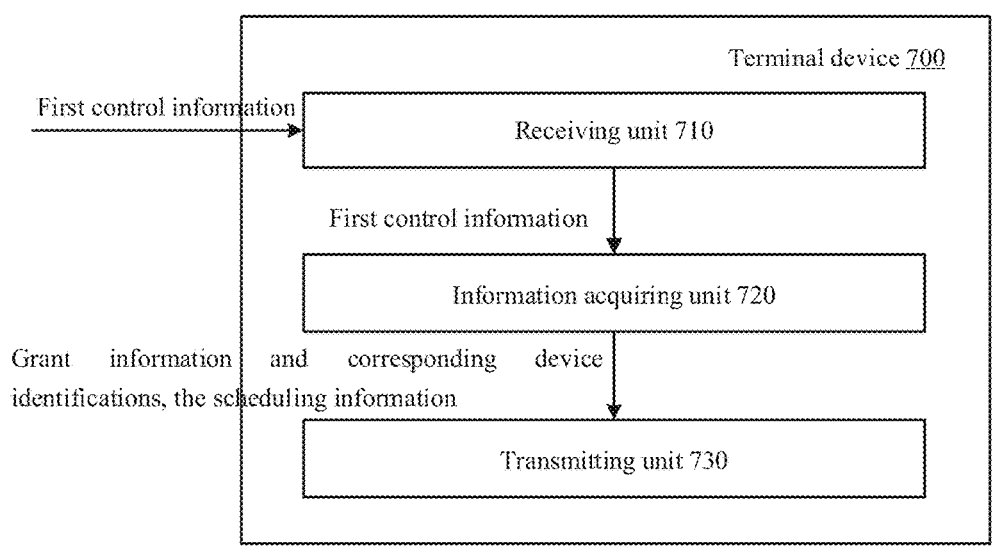
FIG. 7 shows a block diagram of the terminal device according to embodiments of the present invention.

Next, the terminal device according to embodiments of the present invention will be described with reference to FIG. 7. FIG. 7 shows a block diagram of a terminal device 700 according to embodiments of the present invention. As shown in FIG. 7, the terminal device 700 includes a receiving unit 710, an information acquiring unit 720 and a transmitting unit 730. The terminal device 700 may include other components in addition to these three units, however, since these components are not related to the content of embodiments of the present invention, the illustration and description thereof are omitted herein. In addition, since specific details of operations described below performed by the terminal device 700 according to embodiments of the present invention are the same as those described above with reference to FIG. 4, the repeated description of the same details is omitted herein to avoid repetition.

The receiving unit 710 receives the first control information, where the first control information may include the grant information, and information on the transmitting device identification and the receiving device identification corresponding to the grant information. For example, the terminal device may receive the first control information transmitted from the relay device by Device-to-Device transmission. According to one example of the present invention, the terminal device may receive the first control information by the SA resource block(s) in the Scheduling Assignment resource pool, the unicast resource block(s) in the unicast resource pool or the data resource in the data resource pool.

The information acquiring unit 720 determines the grant information and the transmitting device identification and the receiving device identification corresponding to the grant information according to the first control information. According to one example of the present invention, the first control information may include the information field and the check field, and the grant information, the transmitting device identification and the receiving device identification are added into the information field of the first control information. The information acquiring unit 720 may extract the grant information, and the transmitting device identification and the receiving device identification corresponding to the grant information from the information field of the first control information.

According to another example of the present invention, the grant information and the receiving device identification may be added into the information field of the first control information, and the check field of the first control information may be scrambled by the transmitting device identification. The information acquiring unit 720 extracts the grant information and the receiving device identification corresponding to the grant information from the information field of the first control information, and then descramble the check field of the first control information by using the identification of the terminal device to determine whether or not the terminal device is the transmitting device.

When the terminal device is determined to be the transmitting device or the receiving device according to the transmitting device identification and the receiving device identification, the transmitting unit 730 performs transmission or receipt by using the resource indicated by the grant information.

The operations of the base station 500, the relay device 600 and the terminal device 700 can be implemented by hardware or by a software module executed by a processor, or can be further implemented by their combination. For example, the determining unit in the base station, the information generating unit in the relay device and the information acquiring unit in the terminal device can be implemented by the software module executed by the processor. The software module may be arranged in a storage medium in any format, such as a RAM (Random Access Memory), a flash memory, a ROM (Read Only Memory), an EPROM (Erasable Programmable ROM), an EEPROM (Electrically Erasable Programmable ROM), a register, a hard disk, a removable disk, and/or a CD-ROM.

Such storage medium is connected to the processor so that the processor can write information into the storage medium or read information from the storage medium. Such storage medium can also be accumulated in the processor. Such storage medium and processor may be arranged in an ASIC. Such ASIC may be arranged in the base station 500, the relay device 600 and the terminal device 700. As discrete components, such storage medium and processor may be arranged in the base station 500, the relay device 600 and the terminal device 700.

Therefore, the present invention has been explained in detail by using the above embodiments; however, it is apparent for those skilled in the art that the present invention is not limited to the embodiments explained herein. The invention may be implemented in a corrected, modified mode without departing from the scope of the invention defined by the claims. Therefore, the description of the specification is merely intended to explain the examples, and does not impose any limit on the present invention.

What is claimed is:

1. A relay device comprising:
a receiving unit configured to receive grant information for inter-device transmission and a transmitting device identification and a receiving device identification corresponding to the grant information;
a processor configured to generate first control information according to the grant information, the transmitting device identification and the receiving device identification; and
a transmitting unit configured to transmit the first control information to terminal devices performing the inter-device transmission,
wherein the relay device is different from the terminal devices performing the inter-device transmission, and
the receiving unit is further configured to receive scheduling information,
the transmitting unit transmits the first control information according to the scheduling information, and wherein
the relay device discards a not-transmitted part of the first control information when the entire first control information cannot be transmitted within a predetermined time period.

2. The relay device of claim 1, wherein
the processor adds the grant information, the transmitting device identification and the receiving device identification into an information field of the first control information, to generate the first control information.

3. The relay device of claim 2, wherein the transmitting unit transmits the first control information by using a resource block in a Scheduling Assignment resource pool.

4. The relay device of claim 2, wherein the transmitting unit transmits the first control information by using a resource block in a unicast resource pool.

5. The relay device of claim 2, wherein
the receiving unit receives a plurality of pieces of grant information, and a transmission device identification and a receiving device identification corresponding to each of the plurality of pieces of grant information;
the processor generates the first control information for each piece of grant information according to the grant information, and the transmitting device identification and the receiving device identification corresponding to the grant information.

6. The relay device of claim 2, wherein
the transmitting unit transmits the first control information by using a resource block in a data resource pool.

7. The relay device of claim 1, wherein the processor is further configured to add the grant information and the transmitting device identification into an information field of the first control information,
scramble a check field of the first control information by using the transmitting device identification, and
generate the first control information according to the information field and the scrambled check field.

8. The relay device of claim 7, wherein the processor is further configured to add other control information different from the grant information into an information field of second control information, scramble a check field of the second control information by using a second identification different from the transmitting device identification, and generate the second control information based on the information field of the second control information and the scrambled check field of the second control information;

the transmitting unit further configured to transmit the second control information by using a resource block in a Scheduling Assignment resource pool.

9. The relay device of claim 8, wherein the receiving unit receives a plurality of pieces of grant information, and a transmission device identification and a receiving device identification corresponding to each of the plurality of pieces of grant information;

the processor generates the first control information according to the plurality of pieces of grant information, and the transmitting device identification and the receiving device identification corresponding to each of the plurality of pieces of grant information.

10. A base station, comprising:

a processor configured to determine grant information for inter-device transmission and a transmitting device identification and a receiving device identification corresponding to the grant information, and a transmitting unit configured to transmit to a relay device the grant information and the transmitting device identification and the receiving device identification corresponding to the grant information; wherein the processor is further configured to determine scheduling information, the scheduling information indicating a time when the relay device transmits the grant information and the transmitting device identification and the receiving device identification corresponding to the grant information; and the transmitting unit is further configured to transmit to the relay device the scheduling information, wherein the relay device is different from terminal devices performing the inter-device transmission.

* * * * *